(12) United States Patent
Jiang et al.

(10) Patent No.: US 11,509,001 B2
(45) Date of Patent: Nov. 22, 2022

(54) THERMAL MANAGEMENT POWER BATTERY ASSEMBLY AND BATTERY PACK

(71) Applicant: EVE ENERGY CO., LTD., Huizhou (CN)

(72) Inventors: Jibing Jiang, Huizhou (CN); Yanqiang Feng, Huizhou (CN); Dingding Yuan, Huizhou (CN); Guomin Huang, Huizhou (CN); Jincheng Liu, Huizhou (CN)

(73) Assignee: EVE ENERGY CO., LTD., Guangdong (CN)

( * ) Notice: Subject to any disclaimer, the term of this patent is extended or adjusted under 35 U.S.C. 154(b) by 108 days.

(21) Appl. No.: 16/316,894

(22) PCT Filed: Dec. 18, 2017

(86) PCT No.: PCT/CN2017/116947
§ 371 (c)(1),
(2) Date: Aug. 2, 2019

(87) PCT Pub. No.: WO2018/209950
PCT Pub. Date: Nov. 22, 2018

(65) Prior Publication Data
US 2019/0386356 A1     Dec. 19, 2019

(30) Foreign Application Priority Data
May 16, 2017 (CN) .......................... 201710342897.X

(51) Int. Cl.
*H01M 10/613* (2014.01)
*H01M 10/617* (2014.01)
(Continued)

(52) U.S. Cl.
CPC ....... *H01M 10/613* (2015.04); *H01M 10/617* (2015.04); *H01M 10/625* (2015.04);
(Continued)

(58) Field of Classification Search
CPC ............. H01M 10/613; H01M 10/617; H01M 10/653; H01M 10/6567
See application file for complete search history.

(56) References Cited

U.S. PATENT DOCUMENTS

2016/0064783 A1    3/2016    Chorian et al.

FOREIGN PATENT DOCUMENTS

| CN | 205543147 U | 8/2016 |
|---|---|---|
| CN | 106328853 A | 1/2017 |

(Continued)

OTHER PUBLICATIONS

European Search Report (EP 17910025.0), dated May 19, 2020.
Korean Office Action (KR 10-2019-7001355), dated Jul. 22, 2020 (with translation).

*Primary Examiner* — Ula C Ruddock
*Assistant Examiner* — Thomas H. Parsons
(74) *Attorney, Agent, or Firm* — Hunton Andrews Kurth LLP

(57) ABSTRACT

A thermal management power battery assembly and a battery pack having a plurality of the thermal management power battery assemblies connected in series. The battery assembly includes a plurality of staggered battery cells, a thermal conduction module, a liquid cooling module, and a battery cell fixing module for fixing the battery cells. The battery cell fixing module includes a battery cell position limiting device, and assembly supporting device located at two sides of the battery cell position limiting device; the liquid cooling module is integrated in the assembly supporting device; the thermal conduction module is simultaneously in contact with the battery cells and the assembly supporting device. The liquid cooling module is integrated with the assembly supporting device. The liquid cooling module is intergrated with the assembly supporting device.

14 Claims, 15 Drawing Sheets

(51) Int. Cl.
    *H01M 10/625*     (2014.01)
    *H01M 10/653*     (2014.01)
    *H01M 10/6567*     (2014.01)
    *H01M 10/658*     (2014.01)
    *H01M 50/20*     (2021.01)

(52) U.S. Cl.
    CPC ....... *H01M 10/653* (2015.04); *H01M 10/658* (2015.04); *H01M 10/6567* (2015.04); *H01M 50/20* (2021.01); *H01M 2220/20* (2013.01)

(56) References Cited

FOREIGN PATENT DOCUMENTS

| | | | | |
|---|---|---|---|---|
| CN | 106410319 | A | 2/2017 | |
| CN | 106558745 | * | 4/2017 | |
| CN | 106558745 | A | 4/2017 | |
| CN | 106935758 | A | 7/2017 | |
| CN | 206893653 | U | 1/2018 | |
| KR | 10-2014-014798 | A | 12/2014 | |
| KR | 10-2016-0087082 | A | 7/2016 | |
| WO | WO-2012044934 | A1 * | 4/2012 | .......... H01M 10/504 |
| WO | 2015162841 | A1 | 10/2015 | |
| WO | 2016099606 | A1 | 6/2016 | |

* cited by examiner

THERMAL MANAGEMENT POWER BATTERY ASSEMBLY AND BATTERY PACK

CROSS REFERENCE TO RELATED APPLICATION

This is a national stage application, filed under 37 U.S.C. 371, of International Patent Application NO. PCT/CN2017/116947, filed on Dec. 18, 2017, which claims priority to Chinese patent application NO. CN201710342897.X filed on May 16, 2017, contents of both of which are incorporated herein by reference in their entireties.

TECHNICAL FIELD

The present disclosure relates to the technical field of battery, especially to a thermal management power battery assembly and a battery pack having the same.

BACKGROUND

Blade electric vehicles (BEV) use batteries as an energy storage power source to supply electric energy to an electric motor, and the electric motor are driven by the batteries, to drive a car. At present, the batteries usually are cylindrical power battery assemblies.

Common forms of liquid cooling assemblies of cylindrical power battery include: undulating pipe plus a thermal pad, straight pipe plus a thermal pad, or glue filling plus a cooling water pipe. The principle of various liquid cooling assemblies is to circulate coolant in a pipeline, thereby taking away the heat generated by the batteries. However, various liquid cooling solutions currently have their own defects and deficiencies.

1. When the liquid cooling assembly with undulating pipe or straight pipe is employed, it is difficult to process and install the cooling pipeline in the liquid cooling assembly.

2. When the liquid cooling assembly with undulating pipe or straight pipe is employed, there is a great risk of insulation performance of the liquid cooling assembly.

3. When the liquid cooling assembly with undulating pipe or straight pipe is employed, the requirements for the processing precision of the assembly is strict, and the processing cost of the parts of the liquid cooling module is high.

4. When the liquid cooling assembly with glue filling and cooling water pipe is employed, the requirements for the glue are high, such as the requirements for viscosity, density and thermal conductivity of the glue is strict.

5. When the liquid cooling assembly with glue filling and cooling water pipe is employed, the requirements for the design and processing precision of the structural parts of the liquid cooling module are high, and there is a large risk of leaking glue during the filling, which makes the production more difficult.

6. When the liquid cooling assembly with undulating pipe or straight pipe or glue filling is employed, after a thermal runaway occurs between the battery cells, the battery cells can not be directly blocked, and a chain reaction of the thermal runaway is easy to occur.

SUMMARY

The present disclosure provides a high performance thermal management power battery assembly including: a battery cell fixing module, which includes a battery cell position limiting device and an assembly supporting device, wherein the module supporting device is disposed on two sides of the battery cell position limiting device; a plurality of staggered battery cells, which are fixed by the battery cell fixing module; a thermal conduction module, which is in contact with the plurality of staggered battery cells and the assembly supporting device; and a liquid cooling module, which is integrated in the assembly supporting device.

Optionally, the assembly supporting device includes a hollow cavity, a water inlet and a water outlet are disposed on a sidewall of the hollow cavity, pipe joints are respectively disposed at the water inlet and the water outlet, the hollow cavity and the pipe joints constitute the liquid cooling module.

Optionally, a plurality of cavity reinforcements are disposed in the hollow cavity, the plurality of cavity reinforcements are arranged in parallel with each other, two ends of each of the plurality of cavity reinforcements are respectively connected to an inner wall of the hollow cavity.

Optionally, the assembly supporting device includes a device body and a supporting connecting plate, the hollow cavity is disposed in the device body; the supporting connecting plate is fixedly connected to the device body and disposed on a side of the device body away from the plurality of staggered battery cells, a plurality of box connecting holes are disposed at the supporting connecting plate.

Optionally, the battery cell limiting device includes a cover component and a bracket component, the bracket component includes an upper bracket and a lower bracket, the upper bracket and the lower bracket are respectively disposed at two ends of the plurality of staggered battery cells; the cover component includes an upper cover and a lower cover, the upper cover is disposed on a side of the upper bracket away from the plurality of staggered battery cells, the lower cover is disposed on a side of the lower bracket away from the plurality of staggered battery cells.

Optionally, the plurality of staggered battery cells and the bracket component are bonded by ultraviolet (UV) glue, the cover component and the bracket component are both made of a transparent polycarbonate (PC) material.

Optionally, the thermal conduction module is made of thermally conductive graphite; the thermal conduction module surrounds each of the plurality of staggered battery cells, two ends of the thermal conduction module are in contact with the assembly supporting device, respectively.

Optionally, a first position limiting bulge is disposed on a surface of the device body facing to the upper bracket; a second position limiting bulge is disposed on a surface of the device body facing to the upper bracket; the upper bracket is provided with a first position limiting groove capable of cooperating with the first position limiting bulge; the lower bracket is provided with a second position limiting groove capable of cooperating with the second position limiting bulge; the device body is engaged between the upper bracket and the lower bracket through the first position limiting bugle, the second position limiting bugle, the first position limiting groove and the second position limiting groove.

Optionally, first battery cell mounting holes are symmetrically disposed at the upper bracket and the lower bracket; two ends of each of the plurality of staggered battery cells respectively pass through one of the first battery cell mounting holes, and the two ends of each of the plurality of staggered battery cells are fixedly mounted in the upper bracket and the lower bracket; second battery cell mounting holes are respectively disposed at the upper cover and the lower cover, the plurality of second battery cell mounting holes are counterbores; the two ends of each of the plurality of staggered battery cells pass through the first battery cell mounting hole to be located in the counterbores.

The present disclosure also provides a thermal management power battery pack, including: a plurality of thermal management power battery assemblies as described above, a battery pack position limiting device and a battery pack supporting device, where the plurality of thermal management power battery assemblies are arranged in series; the battery pack position limiting device is disposed on the outside of the plurality of thermal management power battery assemblies; and the battery pack supporting device is integrated with the battery pack liquid cooling module.

According to the thermal management power battery assembly and the battery pack of the present disclosure, the liquid cooling module is integrated with the assembly supporting device to reduce the overall weight and production cost, and to ensure the reliability of the cooling system and the mechanical strength of the assembly supporting device at the same time. The battery cell position limiting device is a four-layer structure, which solves a problem that the battery cell strength is inconsistent with the battery cell height, realizes the basis of mechanical automatic production, and can provide higher production capacity. When the plurality of staggered battery cells are bonded by ultraviolet (UV) glue, the curing time of the glue can be accurately control, the controllability of the production is improved. By using a high thermal conductivity material thermally conductive graphite as the heat transfer medium, a cooling function and equalizing function of the battery cell are realized, consistency of the battery cell is improved, and the service life of the battery cell is improved. By wrapping the battery cell in a surrounding manner, the battery cells are isolated from each other, a chain reaction caused by thermal runaway is avoided, system reliability and safety performance are improved.

BRIEF DESCRIPTION OF DRAWINGS

The disclosure will now be described in further detail with reference to the drawings and embodiments.

In the above drawings.

100, battery cell; 200, hollow cavity; 201, cavity reinforcement; 300, assembly supporting device; 310, device body; 311, position limiting groove; 312, position limiting bulge; 320, supporting connecting plate; 321, box connecting hole; 400, thermally conductive graphite; 500, pipe joint; 600, upper bracket; 601, lower bracket; 602, first battery cell mounting hole; 700, lower cover; 701, upper cover; 702, second battery cell mounting hole.

DETAILED DESCRIPTION

In order to make technical problems solved, technical solutions adopted, and technical effects achieved by the present disclosure more clear, the technical solutions of the embodiments of the present disclosure will be further illustrated in detail in conjunction with the drawings, obviously, the described embodiments are only a part of the embodiments of the present disclosure, and not all of the embodiments. Based on the embodiments of the present disclosure, all other embodiments obtained by those skilled in the art without creative efforts are within the scope of the present disclosure.

In the description of the present disclosure, the terms "connected", "connect", and "fixed" are to be understood broadly, for example, the above terms may be a fixed connection, a detachable connection, or an integration, unless otherwise specifically defined and defined. The above terms may be a mechanical connection or an electrical connection; the above terms may be a direct connection or an indirect connection through an intermediate medium, which can be the internal connection of two elements or the interaction of two elements. The specific meaning of the above terms in the present disclosure can be understood based on a specific case by those skilled in the art.

In the present disclosure, unless otherwise specifically specified and defined, the first feature being "on" or "under" the second feature may include direct contact of the first feature and second feature, and may also include a case where the first feature is not directly contacted with the second feature, but is contacted with the second feature through additional features between them.

Moreover, the first feature being "on top of", "above" or "on the surface of" the second feature includes that the first feature is right above or obliquely above the second feature, or merely indicates that the first feature level is higher than the second feature. The first feature being "at the bottom of", "below" or "under" the second feature includes a case where the first feature is directly below and obliquely below the second feature, or merely indicates that the first feature level is less than the second feature.

Figure 1:
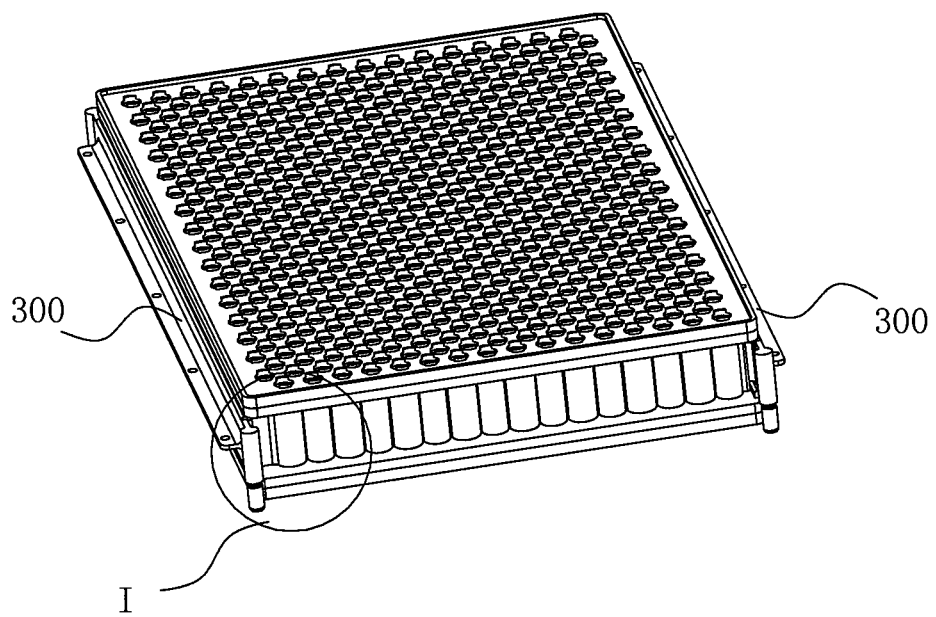
FIG. 1 is a perspective view of a thermal management power battery assembly according to an embodiment of the present disclosure.
Figure 2:
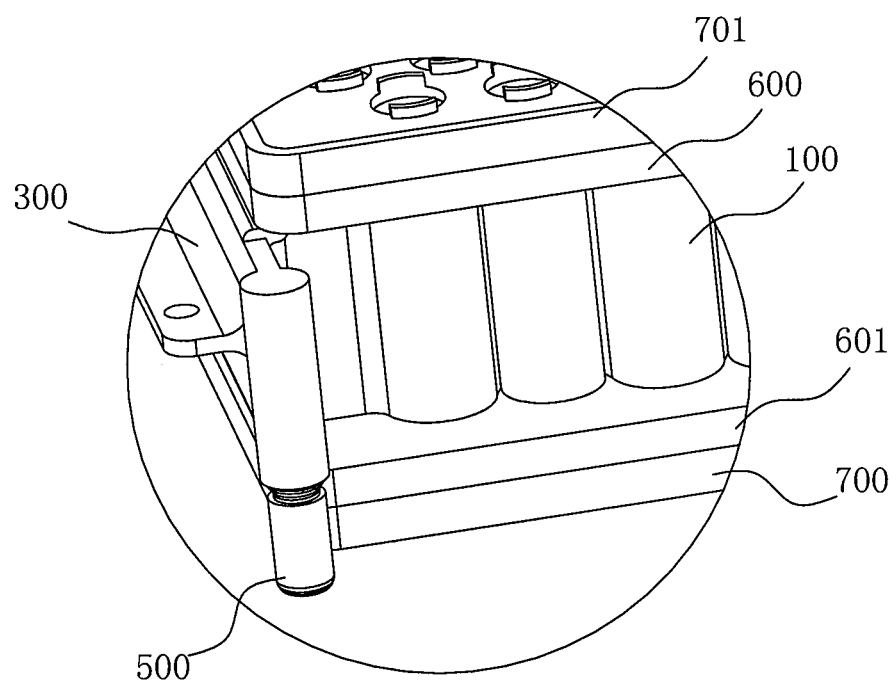
FIG. 2 is an enlarged view of a region I of FIG. 1.
Figure 3:
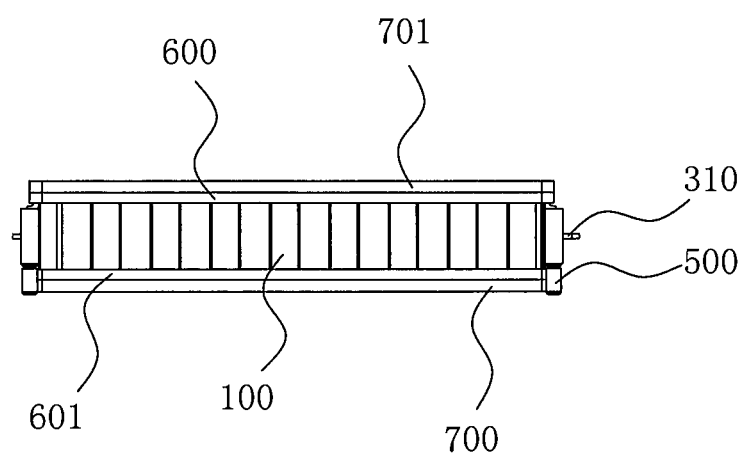
FIG. 3 is a front view of a thermal management power battery assembly according to an embodiment of the present disclosure.
Figure 4:
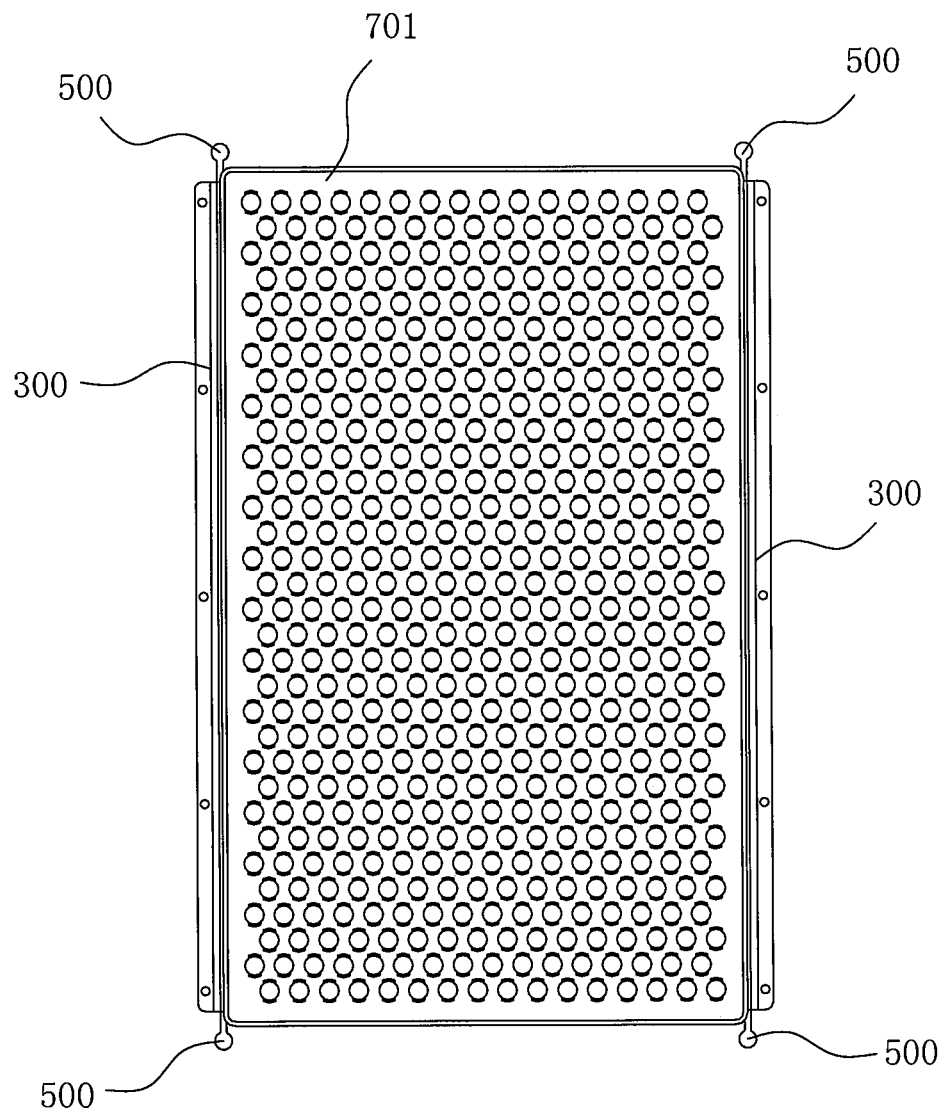
FIG. 4 is a top plan view of a thermal management power battery assembly according to an embodiment of the present disclosure.
Figure 5:
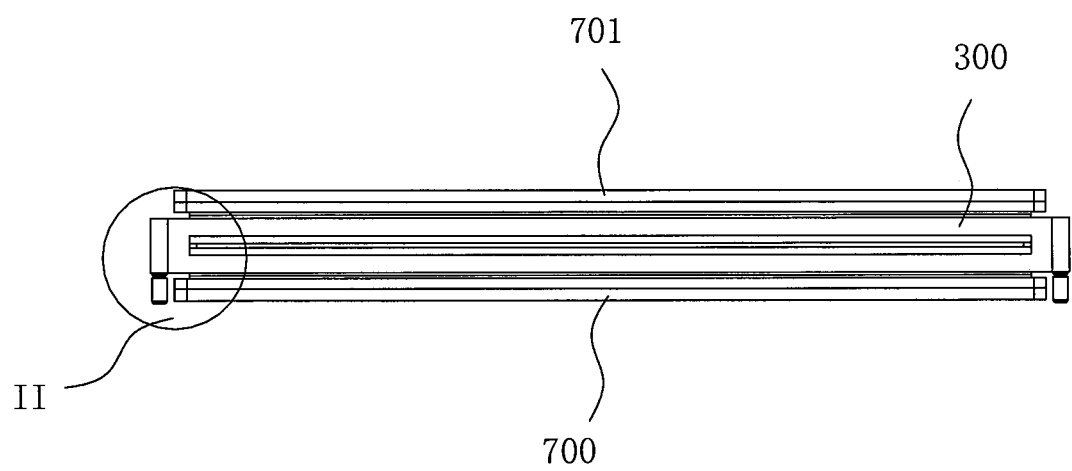
FIG. 5 is a left side view of a thermal management power battery assembly according to an embodiment of the present disclosure.
Figure 6:
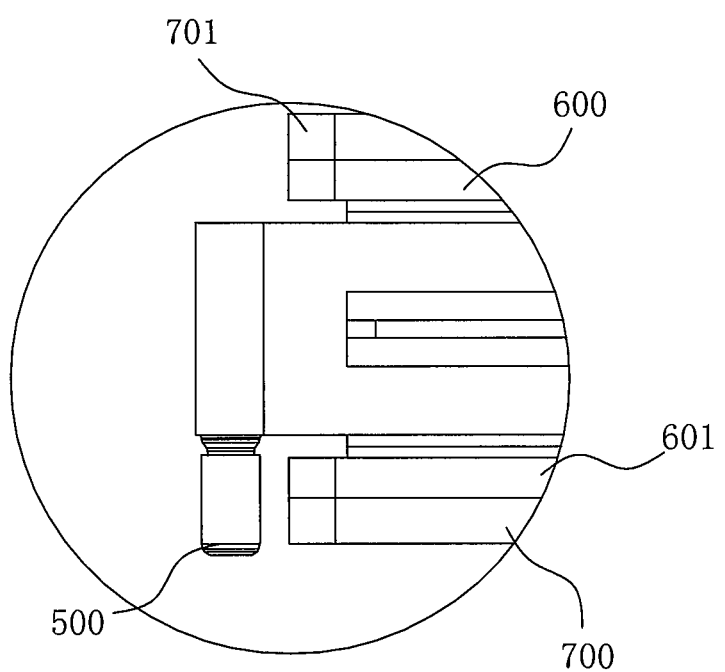
FIG. 6 is an enlarged view of a region II in FIG. 5.
Figure 7:
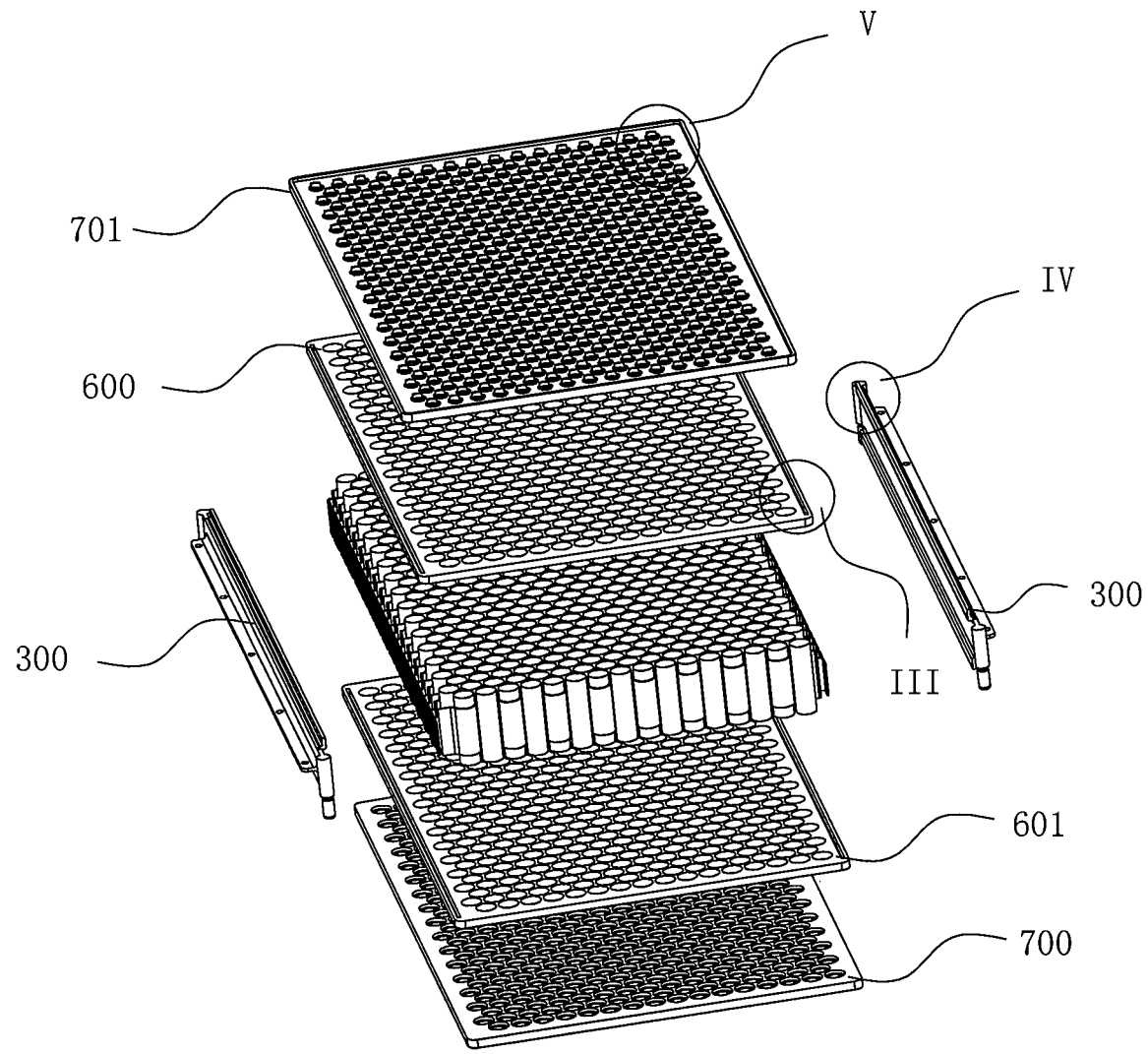
FIG. 7 is a schematic exploded view of a thermal management power battery assembly according to an embodiment of the present disclosure.
Figure 8:
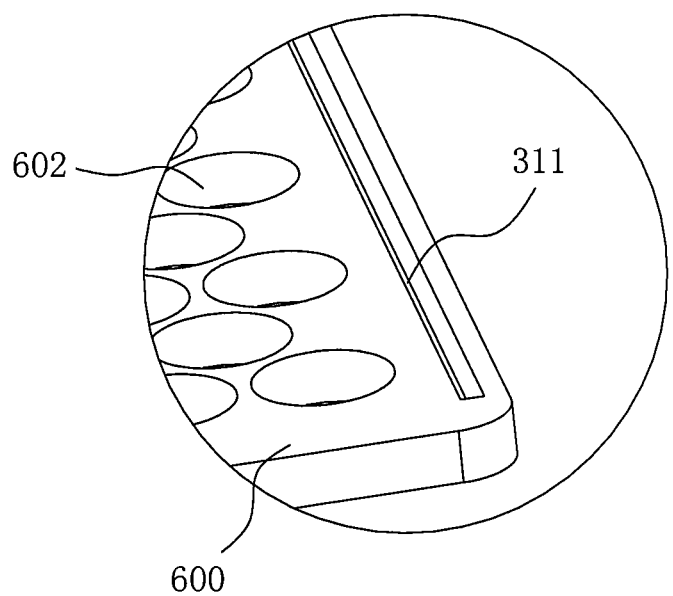
FIG. 8 is an enlarged view of a region III in FIG. 7.
Figure 9:
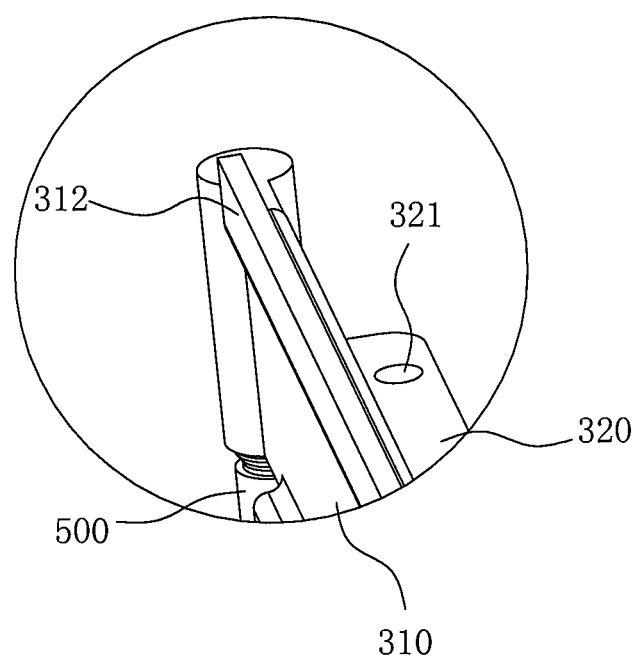
FIG. 9 is an enlarged view of a region IV in FIG. 7.
Figure 10:
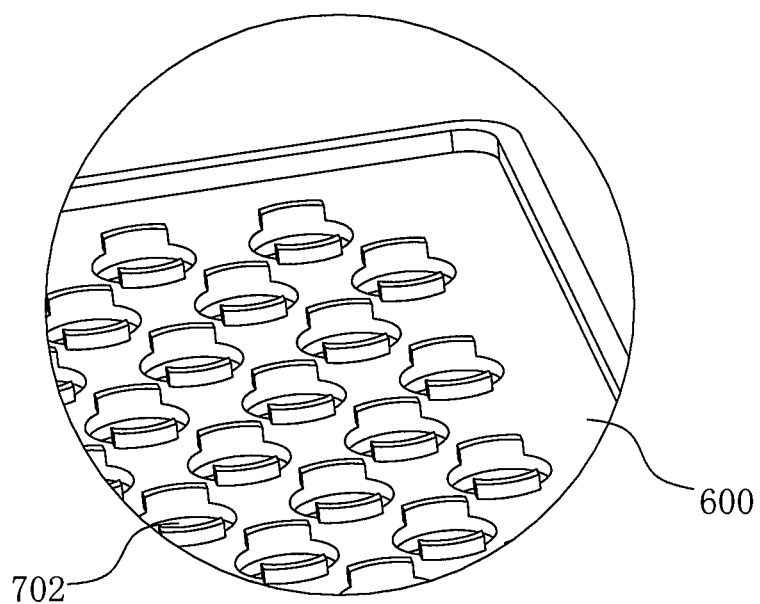
FIG. 10 is an enlarged view of a region V in FIG. 7.
Figure 11:
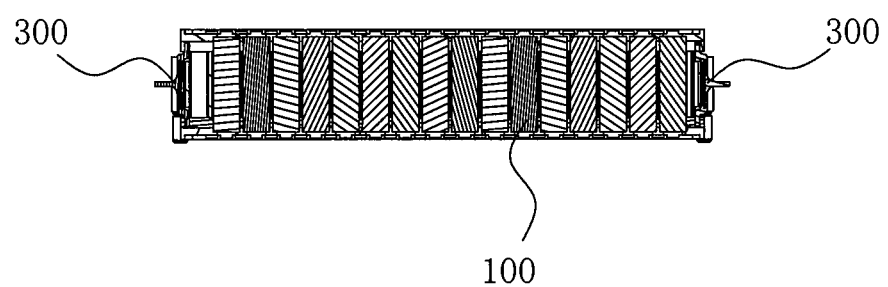
FIG. 11 is a cross-sectional view showing a thermal management power battery assembly in accordance with an embodiment of the present disclosure.
Figure 12:
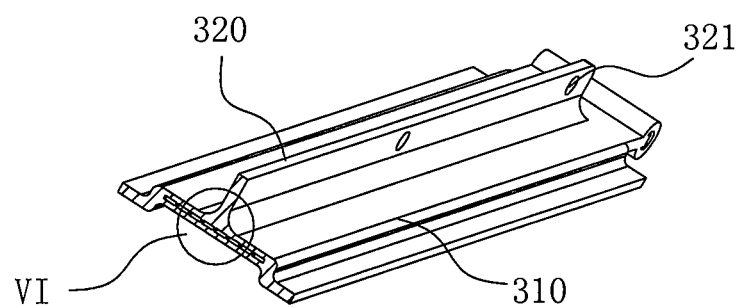
FIG. 12 is a cross-sectional view showing the structure of an assembly supporting device according to an embodiment of the present disclosure.
Figure 13:
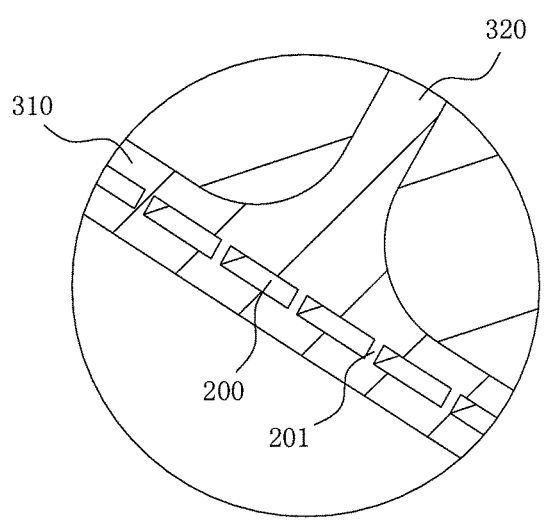
FIG. 13 is an enlarged view of a region VI of FIG. 12.
Figure 14:
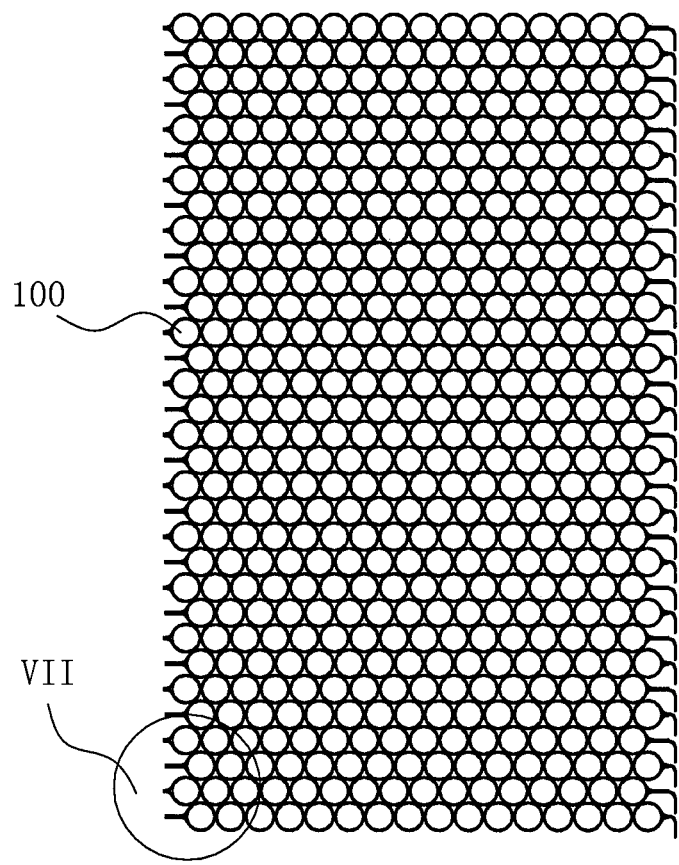
FIG. 14 is a schematic view showing the assembled state of the battery cell and the thermally conductive graphite according to the embodiment of the present disclosure.
Figure 15:
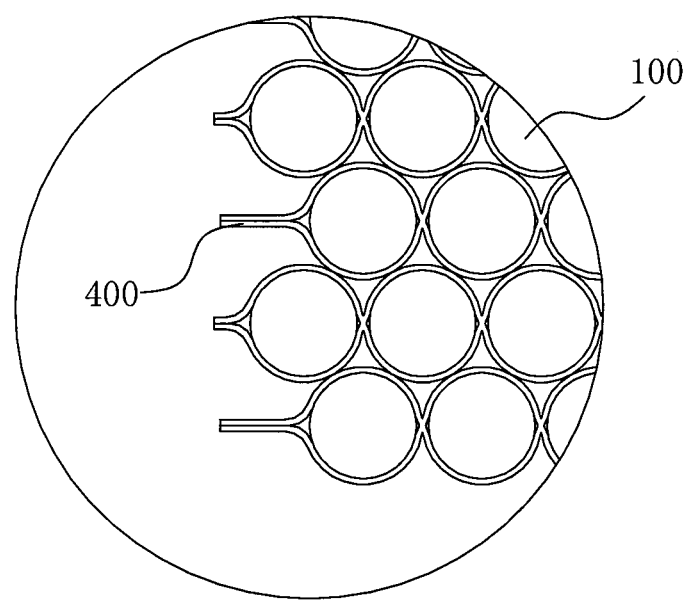
FIG. 15 is an enlarged view of a region VII of FIG. 14.

As shown in FIGS. 1-15, in the present embodiment, a high performance thermal management power battery assembly includes a plurality of staggered battery cells 100, a thermal conduction module, a liquid cooling module, and a battery cell fixing module for fixing the plurality of staggered battery cells 100. The battery cell fixing module includes a battery cell position limiting device and an assembly supporting device 300, and the assembly supporting device 300 is disposed on two sides of the battery cell position limiting device. The liquid cooling module is integrated in the assembly supporting device 300, and the thermal conducting module is in contact with both the battery cells 100 and the assembly supporting device 300 at the same time.

In this solution, the battery cells 100 are staggered according to the thickness of the thermal conduction module, fixed in the battery cell fixing module. Heat is transferred to the assembly supporting device 300 through the thermal conduction module and taken away by the liquid cooling module integrated on the assembly supporting device 300, thereby lowering the temperature of the battery cells 100, and at the same time, by utilizing the high thermal conductivity of the thermal conduction module, the temperature of the same row of the battery cells 100 is leveled, and the temperature uniformity of the battery cells 100 is improved.

Through the integration of the liquid cooling module, the use of the thermal conduction module, and a rational design of the assembly, the arrangement between the battery cells 100 is determined, the gap among the battery cells 100 is reduced by removing the cooling water pipe between the battery cells 100, and more battery cells 100 can be arranged in a unit volume, which reduces the weight of the system, improves the specific energy of the liquid cooling system, and increases the cruising range of vehicle. At the same time, the liquid cooling module is arranged on two sides of the battery cell position limiting device to reduce the actual length of the water pipe, reduce the risk of leakage caused by the liquid cooling module, and improve the reliability of the system. The battery cells 100 are isolated by adopting a reasonable arrangement of a thermal conductive material to avoid the chain reaction of the thermal runaway of the battery cells 100, thereby improving the safety of the system.

The assembly supporting device 300 of the embodiment includes a hollow cavity 200, a water inlet and a water outlet are disposed on a sidewall of the hollow cavity 200, pipe joints 500 are respectively disposed at the water inlet and the water outlet, the hollow cavity 200 and the pipe joints 500 constitute the liquid cooling module.

Optionally, a plurality of cavity reinforcements 201 are disposed in the hollow cavity 200, and the plurality of cavity reinforcements 201 are disposed in parallel with each other, and two ends of each of the plurality of cavity reinforcements 201 are respectively connected to an inner wall of the hollow cavity 200. The assembly supporting device 300 includes a device body 310 and a supporting connecting plate 320, the hollow cavity 200 is disposed in the device body 310, the supporting connecting plate 320 is located on one side of the device body 310 away from the battery cells 100, the supporting connecting plate 320 is fixedly connected to the device body 310, and a plurality of box connecting holes 321 are disposed at the supporting connecting plate 320.

The assembly supporting device 300 is made of an aluminum alloy material. The hollow cavity 200, the cavity reinforcements 201 and the device body 310 are integrally formed by a production process, which can improve the structural strength of the overall bracket while satisfying requirement of cooling, thereby avoiding fatigue damage during long-term use. The pipe joints 500 are brazed at the water inlet and the water outlet of the integrally formed aluminum alloy assembly supporting device 300. In this solution, an automobile-level quick joint is used to ensure sealing performance and durability of the pips of the system. Finally, the corresponding box connecting holes 321 are machined on the supporting connecting plate 320, the battery assembly is fixed in a battery box through the box connecting holes 321 and bolts. Since the fixed connection of the battery module and the battery box is a surface contact connection, the mechanical strength of a plurality of assemblies after fixing is ensured, and the service life the battery assembly is increased.

The battery position limiting device includes a cover component and a bracket component, the bracket component includes an upper bracket 600 and a lower bracket 601. The upper bracket 600 and the lower bracket 601 are respectively disposed at two ends of the battery cells 100. The cover component includes an upper cover 701 and a lower cover 700, the upper cover 701 is located on one side of the upper bracket 600 away from the battery cells 100, and the lower cover 700 is located on one side of the lower bracket 601 away from the battery cells 100.

The battery cells 100 are bonded to the bracket component by UV glue, the cover component and the bracket component are both made of a transparent PC material.

The battery cell position limiting device described in the present solution has a four-layer structure, and the four-layer structure is made of a transparent PC material. The purpose of using the transparent PC material is that the ultraviolet irradiation can pass through the transparent PC material after using UV glue to fix the intermediate battery cell 100, thus the curing of the UV glue can be effectively realized, and the curing time can be accurately controlled, which is more conducive to the automation of production. Using the UV glue to bond the battery cell 100 can ensure greater mechanical strength and durability, and improve reliability of products. The purpose of adopting the four-layer structure is to fix the cell 100 and the upper bracket 600 and the bottom by the UV glue, thereby better controlling the overall height consistency of the battery cells 100, and reducing the requirements of the busbars device of the bottom and top to achieve automation faster.

The thermal conduction module is made of thermally conductive graphite 400. The thermal conduction module surrounds each of the battery cells 100 and is integrally formed. Two ends of the thermal conduction module are respectively in contact with the assembly supporting device 300.

In a battery thermal management system using a liquid cooling method, the way of taking away the heat generated by the battery cells 100 is the key to the system design. In the high performance thermal management system of this embodiment, the graphite composite material with high thermal conductivity is used as a heat transfer medium, the graphite composite material is wrapped around the surface of the battery cells 100 and bonded to the surface of the battery cells 100, and the heat generated by the battery cells 100 is transmitted to the assembly supporting device 300 on two sides by the high thermal conductivity of the graphite composite material, thereby taking away the heat and unifying temperature among the battery cells 100. Due to the insulating properties of the materials used, each of the battery cells 100 is completely isolated from others of the battery cells 100 in a surrounding manner, thereby isolating the other battery cells 100 after a thermal runaway of one single battery cell 100, forming a shield, to avoid other battery cells 100 directly contacting the one single battery cell 100 and thus avoid chain reaction and system thermal runaway. Safety and reliability of the thermal management system are increased.

A plurality of position limiting bulges 312 are respectively disposed on the surface of the upper bracket 600 and the lower bracket 601. A plurality of position limiting grooves 311 correspond to the limiting bulges 312 are disposed at the upper bracket 600 and the lower bracket 601. The device body 310 is engaged between the upper bracket 600 and the lower bracket 601 through the position limiting bulges 312 and the position limiting grooves 311.

Optionally, first battery cell mounting holes 602 are symmetrically disposed at the upper bracket 600 and the lower bracket 601, two ends of the battery cells 100 respectively pass through the first battery cell mounting holes 602 to be fixedly mounted in the upper bracket 600 and the lower bracket 601. Second battery cell mounting holes 702 are respectively disposed at the upper cover 701 and the lower cover 700, the second battery cell mounting holes 702 are counterbores, and the two ends of each of the battery cells 100 pass through the first battery cell mounting hole 602 to be located in the counterbores.

Also provided in this embodiment is a thermal management power battery pack, including: a plurality of thermal management power battery assemblies as described above. The high-performance thermal management power battery assemblies are connected in series with each other. A battery pack position limiting device and a battery pack supporting device are disposed on the outside of the plurality of thermal management power battery assemblies; and the battery pack supporting device is integrated with the battery pack liquid cooling module.

What is claimed is:

1. A thermal management power battery assembly, comprising:
    a battery cell fixing module, which comprises a battery cell position limiting device and an assembly supporting device, wherein the assembly supporting device is disposed on two sides of the battery cell position limiting device, the assembly supporting device comprises a hollow cavity, the assembly supporting device comprises a device body, the hollow cavity is disposed in the device body, the battery cell position limiting device is located entirely outside of the hollow cavity, the battery cell position limiting device is not in direct physical contact with the hollow cavity, and a water inlet and a water outlet are disposed on a sidewall of the hollow cavity;
    a plurality of staggered battery cells, which are fixed by the battery cell fixing module;
    a thermal conduction module, which is in contact with the plurality of staggered battery cells and the assembly supporting device; and
    a liquid cooling module, which is integrated in the assembly supporting device, wherein the liquid cooling module comprises the hollow cavity,
    wherein pipe joints are respectively disposed at the water inlet and the water outlet, the hollow cavity and the pipe joints constitute the liquid cooling module; and
    wherein a plurality of cavity reinforcements are disposed in the hollow cavity, the plurality of cavity reinforcements are arranged in parallel with each other, two ends of each of the plurality of cavity reinforcements are respectively connected to an inner wall of the hollow cavity.

2. The thermal management power battery assembly according to claim 1, wherein the assembly supporting device further comprises a supporting connecting plate;
    the supporting connecting plate is fixedly connected to the device body and disposed on a side of the device body away from the plurality of staggered battery cells, a plurality of box connecting holes are disposed at the supporting connecting plate.

3. The thermal management power battery assembly according to claim 1, wherein, the battery cell position limiting device comprises a cover component and a bracket component,
    the bracket component comprises an upper bracket and a lower bracket, the upper bracket and the lower bracket are respectively disposed at two ends of the plurality of staggered battery cells;
    the cover component comprises an upper cover and a lower cover, the upper cover is disposed on a side of the upper bracket away from the plurality of staggered battery cells, the lower cover is disposed on a side of the lower bracket away from the plurality of staggered battery cells.

4. The thermal management power battery assembly according to claim 3, wherein,
    the plurality of staggered battery cells and the bracket component are bonded by ultraviolet (UV) glue, the cover component and the bracket component are both made of a transparent polycarbonate (PC) material.

5. The thermal management power battery assembly according to claim 3, wherein,
    a first position limiting bulge is disposed on a surface of the device body facing to the upper bracket;
    a second position limiting bulge is disposed on a surface of the device body facing to the lower bracket;
    the upper bracket is provided with a first position limiting groove capable of cooperating with the first position limiting bulge;
    the lower bracket is provided with a second position limiting groove capable of cooperating with the second position limiting bulge;
    the device body is engaged between the upper bracket and the lower bracket through the first position limiting bugle, the second position limiting bugle, the first position limiting groove and the second position limiting groove.

6. The thermal management power battery assembly according to claim 5, wherein,
    first battery cell mounting holes are symmetrically disposed at the upper bracket and the lower bracket;
    two ends of each of the plurality of staggered battery cells respectively pass through one of the first battery cell mounting holes, and the two ends of each of the plurality of staggered battery cells are fixedly mounted in the upper bracket and the lower bracket;
    second battery cell mounting holes are respectively disposed at the upper cover and the lower cover, the second battery cell mounting holes are counterbores;
    the two ends of each of the plurality of staggered battery cells pass through the first battery cell mounting hole to be located in the counterbores.

7. The thermal management power battery assembly according to claim 1, wherein,
    the thermal conduction module is made of thermally conductive graphite;
    the thermal conduction module surrounds each of the plurality of staggered battery cells, and two ends of the thermal conduction module are in contact with the assembly supporting device, respectively.

8. A thermal management power battery pack, comprising: a plurality of thermal management power battery assemblies, a battery pack position limiting device and a battery pack supporting device, wherein, each of the plurality of thermal management power battery assemblies comprises:
- a battery cell fixing module, which comprises a battery cell position limiting device and an assembly supporting device, wherein the assembly supporting device is disposed on two sides of the battery cell position limiting device, the assembly supporting device comprises a hollow cavity, the assembly supporting device comprises a device body, the hollow cavity is disposed in the device body, the battery cell position limiting device is located entirely outside of the hollow cavity, the battery cell position limiting device is not in direct physical contact with the hollow cavity, and a water inlet and a water outlet are disposed on a sidewall of the hollow cavity;
- a plurality of staggered battery cells, which are fixed by the battery cell fixing module;
- a thermal conduction module, which is in contact with the plurality of staggered battery cells and the assembly supporting device; and
- a liquid cooling module, which is integrated in the assembly supporting device, wherein the liquid cooling module comprises the hollow cavity; the plurality of thermal management power battery assemblies are arranged in series;

the battery pack position limiting device is disposed on the outside of the plurality of thermal management power battery assemblies; and the battery pack supporting device is integrated with the battery pack liquid cooling module, wherein pipe joints are respectively disposed at the water inlet and the water outlet, the hollow cavity and the pipe joints constitute the liquid cooling module;

wherein a plurality of cavity reinforcements are disposed in the hollow cavity, the plurality of cavity reinforcements are arranged in parallel with each other, two ends of each of the plurality of cavity reinforcements are respectively connected to an inner wall of the hollow cavity.

9. The thermal management power battery pack according to claim 8, wherein, the assembly supporting device comprises a supporting connecting plate;

the supporting connecting plate is fixedly connected to the device body and disposed on a side of the device body away from the plurality of staggered battery cells, a plurality of box connecting holes are disposed at the supporting connecting plate.

10. The thermal management power battery pack according to claim 8, wherein, the battery cell position limiting device comprises a cover component and a bracket component, the bracket component comprises an upper bracket and a lower bracket, the upper bracket and the lower bracket are respectively disposed at two ends of the plurality of staggered battery cells;

the cover component comprises an upper cover and a lower cover, the upper cover is disposed on a side of the upper bracket away from the plurality of staggered battery cells, the lower cover is disposed on a side of the lower bracket away from the plurality of staggered battery cells.

11. The thermal management power battery pack according to claim 10, wherein, the plurality of staggered battery cells and the bracket component are bonded by ultraviolet (UV) glue, the cover component and the bracket component are both made of a transparent polycarbonate (PC) material.

12. The thermal management power battery pack according to claim 10, wherein, a first position limiting bulge is disposed on a surface of the device body facing to the upper bracket;

a second position limiting bulge is disposed on a surface of the device body facing to the lower bracket;

the upper bracket is provided with a first position limiting groove capable of cooperating with the first position limiting bulge;

the lower bracket is provided with a second position limiting groove capable of cooperating with the second position limiting bulge;

the device body is engaged between the upper bracket and the lower bracket through the first position limiting bugle, the second position limiting bugle, the first position limiting groove and the second position limiting groove.

13. The thermal management power battery pack according to claim 12, wherein, first battery cell mounting holes are symmetrically disposed at the upper bracket and the lower bracket;

two ends of each of the plurality of staggered battery cells respectively pass through one of the first battery cell mounting holes, and the two ends of each of the plurality of staggered battery cells are fixedly mounted in the upper bracket and the lower bracket;

second battery cell mounting holes are respectively disposed at the upper cover and the lower cover, the second battery cell mounting holes are counterbores;

the two ends of each of the plurality of staggered battery cells pass through the first battery cell mounting hole to be located in the counterbores.

14. The thermal management power battery pack according to claim 10, wherein, the thermal conduction module is made of thermally conductive graphite;

the thermal conduction module surrounds each of the plurality of staggered battery cells, and two ends of the thermal conduction module are in contact with the assembly supporting device, respectively.

\* \* \* \* \*